US008157061B2

(12) United States Patent
Gremaud et al.

(10) Patent No.: US 8,157,061 B2
(45) Date of Patent: Apr. 17, 2012

(54) ELEVATOR INSTALLATION WITH A BRAKING DEVICE AND METHOD FOR BRAKING AND HOLDING AN ELEVATOR INSTALLATION

(75) Inventors: Nicolas Gremaud, Wädenswil (CH); Steffen Grundmann, Bonstetten (CH); Hans Kocher, Udligenswil (CH)

(73) Assignee: Inventio AG, Hergiswil NW (CH)

( * ) Notice: Subject to any disclaimer, the term of this patent is extended or adjusted under 35 U.S.C. 154(b) by 1344 days.

(21) Appl. No.: 11/303,655

(22) Filed: Dec. 16, 2005

(65) Prior Publication Data

US 2006/0180406 A1 Aug. 17, 2006

(30) Foreign Application Priority Data

Dec. 17, 2004 (EP) .................................... 04029922

(51) Int. Cl.
*B65H 59/10* (2006.01)
*F16D 51/60* (2006.01)

(52) U.S. Cl. ............ 188/67; 188/44; 188/166; 188/180; 187/376

(58) Field of Classification Search .................... 188/44, 188/136, 180, 376, 67; 187/376
See application file for complete search history.

(56) References Cited

U.S. PATENT DOCUMENTS

| | | | | |
|---|---|---|---|---|
| 4,234,063 | A | 11/1980 | Blake | |
| 5,086,882 | A * | 2/1992 | Sugahara et al. | 187/410 |
| 5,253,738 | A * | 10/1993 | Vertesy et al. | 188/171 |
| 5,323,878 | A | 6/1994 | Nakamura et al. | |
| 5,337,878 | A * | 8/1994 | Mehlert et al. | 198/323 |
| 5,363,942 | A * | 11/1994 | Osada | 187/376 |
| 5,411,117 | A | 5/1995 | Hayrinen | |
| 5,648,644 | A * | 7/1997 | Nagel | 187/288 |
| 5,896,949 | A * | 4/1999 | Hamdy et al. | 187/292 |
| 6,318,505 | B1 * | 11/2001 | De Angelis | 187/292 |
| 6,481,805 | B1 * | 11/2002 | Ichinose et al. | 303/11 |
| 6,719,101 | B2 * | 4/2004 | Hugel | 187/376 |
| 7,036,638 | B2 * | 5/2006 | Simmonds et al. | 188/44 |
| 2003/0085078 | A1 * | 5/2003 | Simmonds et al. | 187/373 |

FOREIGN PATENT DOCUMENTS

| | | | |
|---|---|---|---|
| CN | 1034323 | C | 3/1997 |
| DE | 39 34 492 | | 4/1990 |
| EP | 1544148 | A1 * | 6/2005 |
| GB | 2 153 465 | | 8/1985 |
| WO | WO03/004397 | | 1/2003 |

* cited by examiner

*Primary Examiner* — Bradley King
*Assistant Examiner* — Mahbubur Rashid
(74) *Attorney, Agent, or Firm* — Fraser Clemens Martin & Miller LLC; William J. Clemens

(57) ABSTRACT

An elevator installation has braking equipment for braking and holding an elevator car which moves in vertical direction within guide tracks or rails. The braking equipment consists of at least two brake units each comprising a normal force regulation device that sets a normal force ($F_N$) in correspondence with a normal force value determined by a brake control unit and/or a locking device that locks the brake unit in a set braking position and which preferably maintains the set braking position in the case of an interrupted energy supply. The braking equipment provides a gentle braking or holding of the elevator car, which corresponds with the operational state of the elevator installation, with a low energy requirement.

22 Claims, 5 Drawing Sheets

ELEVATOR INSTALLATION WITH A BRAKING DEVICE AND METHOD FOR BRAKING AND HOLDING AN ELEVATOR INSTALLATION

BACKGROUND OF THE INVENTION

The present invention relates to an elevator installation with braking equipment and to a method for braking and arresting an elevator installation.

An elevator installation comprises an elevator car which moves in a vertical direction within guide tracks or guide rails. The elevator car is in the case of need braked or held at standstill by braking equipment. For holding or braking the elevator car a braking force is required. The braking equipment for that purpose usually utilizes at least two brake units which when required press at least one brake lining against a counter-surface. This pressing is effected by means of a normal force. The braking force of a brake lining is determined by the normal force together with the coefficient of friction defined by the brake lining, the counter-surface and any intermediate layers. The counter-force is usually defined by a surface of the guide track or the guide rail.

German patent DE 3934492 shows braking equipment for an elevator car which in the case of braking engages the guide rail, wherein the braking force is regulated by means of an acceleration sensor. The braking force in that case is applied by a spring, wherein in the case of a too-high deceleration value the braking force can be reduced or, in the case of too-low deceleration, amplified by a regulatable magnet.

A disadvantage of this equipment is that the brake equipment is not designed for holding an elevator car in a stopped position, such as, for example, at a regular stop at a floor. In addition, the braking equipment is set to a fixed value which is predetermined by the spring and which in the working case is either moved towards as quickly as possible, which leads to a significant transient process, or which in the working case is moved towards slowly, controlled by the counter-force of the stroke magnets, whereby the speed in the case of a fully laden car disadvantageously increases. Moreover, the regulatable magnet is expensive and heavy, it additionally absorbs a large amount of power, and monitoring of the operational readiness of the equipment can be difficult to carry out. The power requirement is high because the maximum possible braking force to be applied by the braking equipment is oriented towards a freely falling, fully laden car. However, as a rule, for example in the case of braking from excess speed, a car which is unladen or laden only to a small extent is braked. In this connection, only small braking forces are required.

Example: A typical stroke magnet produces, in the case of a power requirement (PM) of up to 4000 W, a stroke force/thrust force (FM) of approximately 1500 N. With the assumption of a lever translation (i) of 3 and a coefficient of friction ($\mu$) of 0.2 there results according to equation $$FBR=FM\times 1\times\mu\times 2$$

a braking force regulating range (FBR) of +/−1800 N per brake housing, or in the case of two brake housings a regulating range (FBR2) of +/−3600 N results. The weight of a corresponding stroke/thrust magnet amounts to up to 50 kg or for two magnets up to 100 kg. With consideration of an additional spring per brake housing, which produces a braking force in each instance of 5000 N, a total braking force of 10,000 N with a braking force regulating range of +/−3600 N thus results in the case of two brake housings. A braking installation with low braking forces of that kind is merely sufficient for safety braking of a car with a total weight of about 1000 kg (useful load 480 kg and car mass 520 kg). The weight of this elevator car is in that case increased by approximately 10% and the necessary electrical regulating power is up to 2×4 kW.

U.S. Pat. No. 5,323,878 discloses further braking equipment with two brake units. The brake units are arranged in the region of a drive motor. The braking forces are transmitted by way of support elements from the drive motor to the car. The braking force of each brake unit is determined by a brake control unit with consideration of the car speed or car load. In the mentioned example, the braking force is produced by means of a spring, wherein a hydraulic piston force counteracts this spring. This embodiment corresponds with a currently usual, safer mode of construction, since in the case of failure of the hydraulic system the springs brake with their maximum possible force. The requisite hydraulic piston force of each brake is calculated by a brake control unit with consideration of the car speed or car load and hydraulically controlled. The hydraulic piston force must in that case be established with consideration of brake-specific characteristics, such as piston diameter, spring force or installation geometry of each brake unit.

A disadvantage of this equipment is that relevant influencing factors, which influence the braking force, are not recognized and not taken into consideration. A defect of a spring, wear of a brake lining or jamming of brake levers can lead to a relevant influencing of the braking force, which is not recognized. Moreover, the brake control unit must take into consideration brake-specific characteristics, such as piston diameter, spring force or installation geometry, of each brake unit, since the brake control unit presets the hydraulic piston force for each individual brake unit. These disadvantages potentially increase the susceptibility to fault in the case of installation and in the case of replacement as well as in operation; hence the brake-specific characteristics of each brake unit have to be input at the brake control unit.

SUMMARY OF THE INVENTION

An object of the present invention is accordingly to provide regulatable braking equipment and a method for braking and holding an elevator car, which enables retardation or holding in correspondence with the operational state of the elevator installation and responds quickly and in gentle manner. The braking equipment must, in addition, fulfill high safety demands and it shall be able to be operated with lower power and have little additional weight. The susceptibility of the braking equipment to fault shall, moreover, be low.

According to the present invention each brake unit comprises a first or normal force regulation which regulates an effective first or normal force in correspondence with a target force value determined by a brake control unit and/or each brake unit comprises a locking device which can lock the brake unit in a set braking position corresponding with a set first or normal force.

The solution according to the present invention has the advantageous effect that each brake unit has an own normal force regulation, which regulates an effective normal force in correspondence with a target normal force, so that an own target normal force can be associated with each brake unit. The brake unit itself can thus quickly and accurately set a normal force and thus independently correct deviations in the region of the brake unit, such as geometric deviations (for example, wear of a brake plate or different dimensions of brake rails), by a regulating process. Susceptibility of the overall braking equipment to fault is thereby significantly reduced. Replacement of a brake unit is possible in simple manner, since the brake-specific characteristics, such as piston diameter, spring force, installation geometry or other constructionally determined data, of the brake unit are taken into consideration in the brake unit itself and thus complicated inputs, which are susceptible to error, of these brake-specific characteristics at the brake central unit are eliminated.

Depending on the braking force requirement an energy-saving and secure normal force distribution or a presetting of the target normal force per brake unit is selected by the brake control unit. The braking force requirement results from an operational state of the elevator installation such as, for example, a loading, a travel speed, a location in the elevator shaft, an acceleration value or other state magnitudes of the elevator car or the elevator installation. This allows a particularly gentle braking of the elevator installation.

According to the present invention, in the case of holding or braking a set braking position can be locked. In that case a set effective normal force is locked. This enables holding or braking of the elevator car without further feed of energy.

The illustrated solutions enable braking or holding of the elevator car in correspondence with the operational state of the elevator installation and the equipment can be rapidly but nevertheless gently, brought into engagement. The solutions fulfill high safety demands and need little power. The susceptibility of the braking equipment to fault is low.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
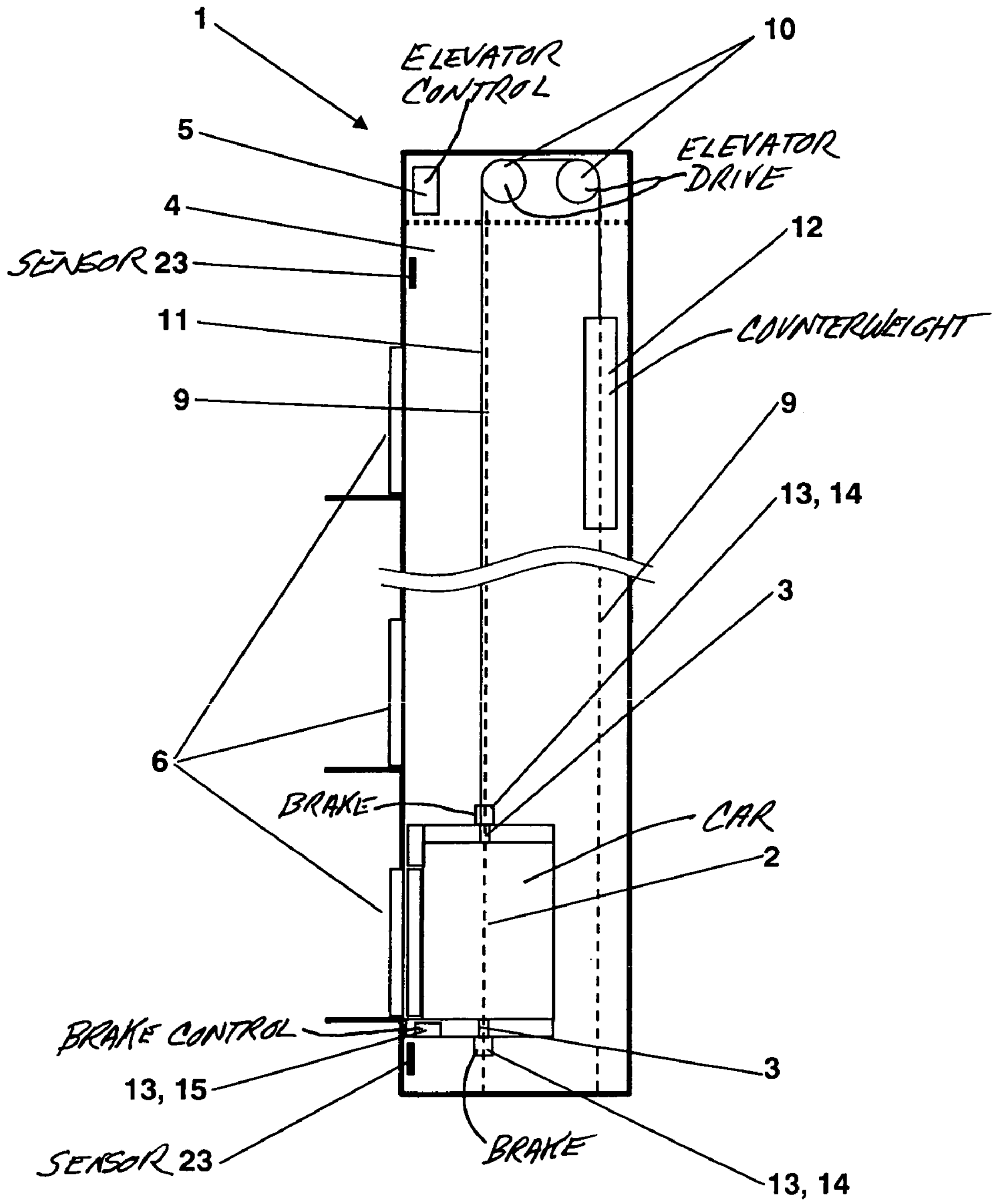
FIG. 1 is schematic side elevation view of an elevator installation with braking equipment according to the present invention.

An elevator installation 1 consists at least of an elevator car 2 and an elevator drive 10. As illustrated in FIG. 1, the elevator installation 1, for example, further requires a support means 11 and a counterweight 12, wherein the elevator drive 10 drives the support means 11 and thus moves the elevator car 2 and the counterweight 12 in diametrical opposition in an elevator shaft 4. The elevator installation 1 also requires at least one braking equipment 13. The braking equipment 13 holds the stationary elevator car 2—for example, during the loading time at a floor 6—or it brakes the elevator car 2 in an emergency situation—for example, in the case of unexpected opening of the floor access—or it effects safety braking—for example, in the case of failure of the support means 11—of the elevator car 2 which is moving too fast. These different load cases require different braking or holding forces $F_B$.

Figure 2:
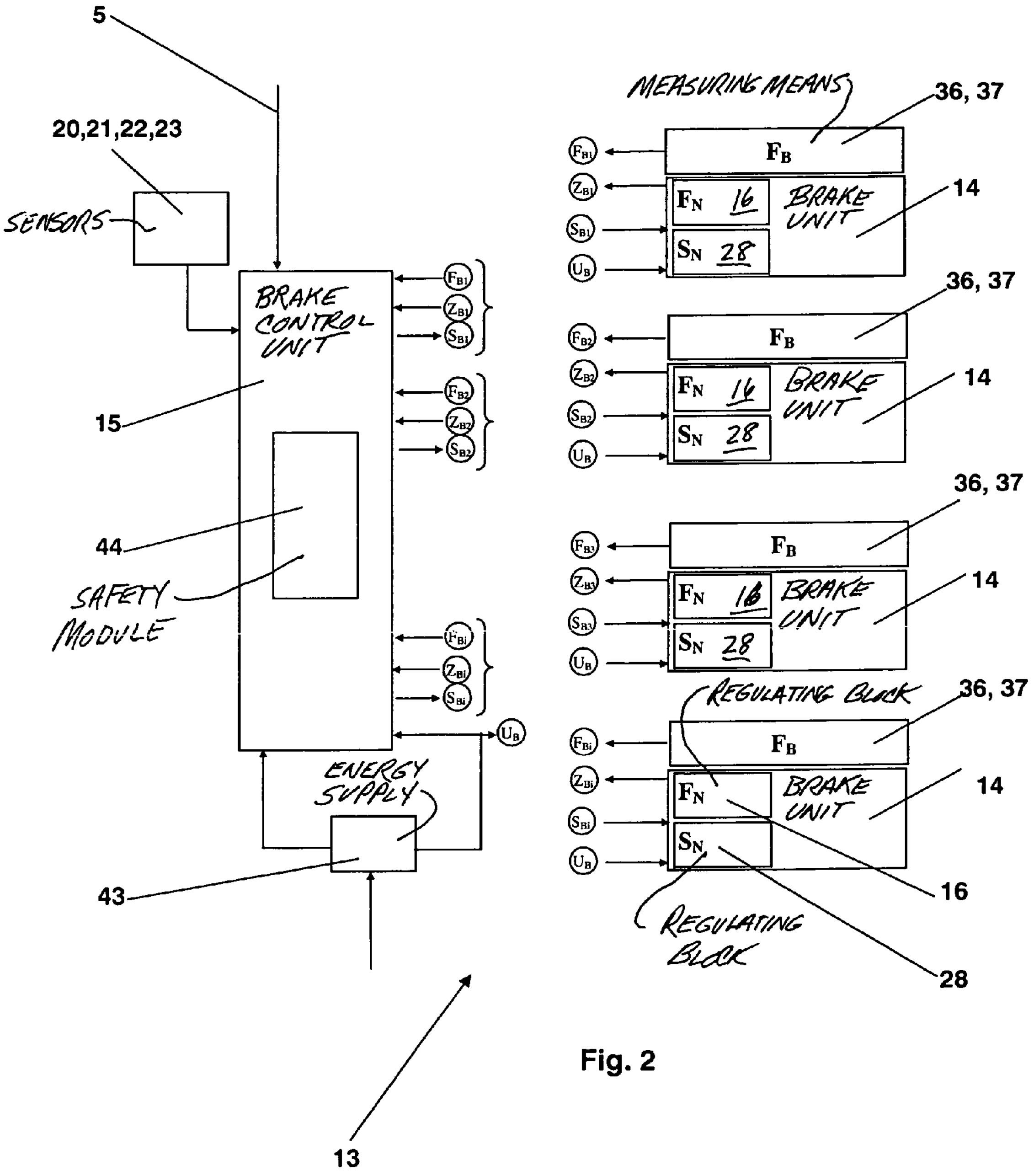
FIG. 2 is a schematic illustration of the braking equipment shown in FIG. 1.
Figure 3:
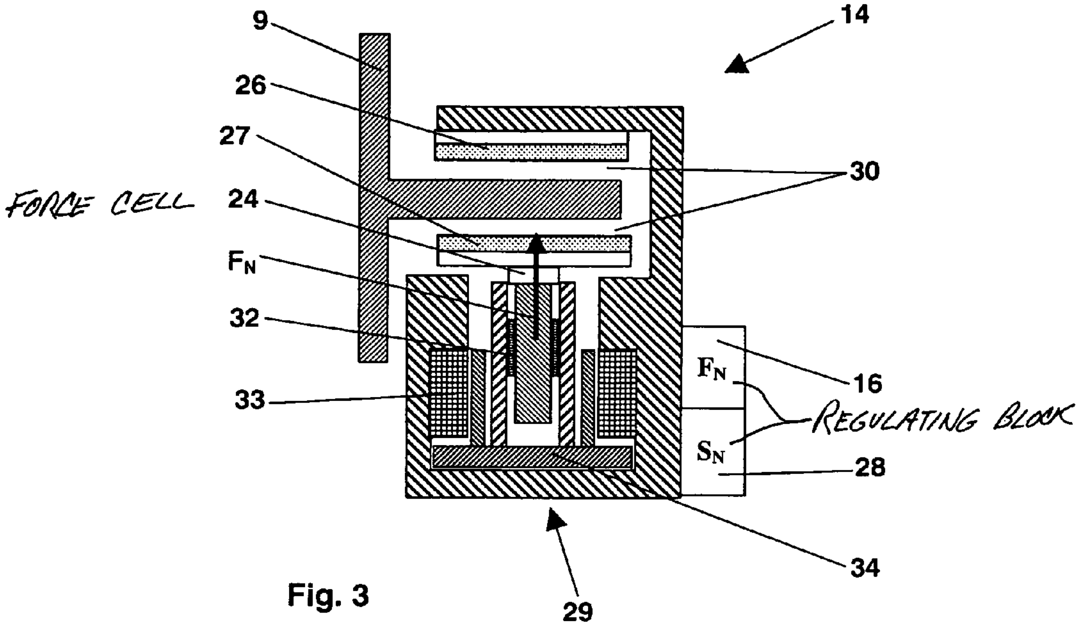
FIG. 3 is a cross-sectional view of the brake unit shown in FIG. 2 with first or normal force regulation.

FIG. 2 shows a variant of the braking equipment 13, which consists of a brake control unit 15 with an energy supply 43 and—in the illustrated example—four functionally identical brake units 14. Functionally identical means that the brake units 14 have the same functional structure, but can be completely different in correspondence with their geometric dimensions. Each brake unit 14 has a brake force measuring means 36, 37. The energy supply 43 supplies the brake control unit 15 and the brake units 14 with a secure voltage $U_B$. An elevator control 5 and measuring sensors 20, 21, 22 and 23 deliver required elevator signals to the brake control unit 15. The brake control unit 15 supplies individual brake units 14 with individual target presets $S_{B1 \ldots i}$. In FIG. 2, "1 to i" stands for the individual brake units 14. A target presetting $S_{Bi}$ is, for example, a target force $F_{N\text{-}soll}$ or a target air gap 30 (FIG. 3). These presets $S_{Bi}$ are transmitted to the associated brake unit 14. The brake unit 14 processes this target preset in regulating blocks 16 ($F_N$), 28 ($S_N$), which operate with known regulating technologies. The brake units 14 supply effective state magnitudes $Z_{B1 \ldots i}$ back to the brake control unit 15. The effective state magnitudes $Z_{B1 \ldots i}$ can in turn be an effective first or normal force $F_{N\text{-}eff}$ or the effective air gap 30. In the illustrated example, each of the brake units 14 has the brake force measuring means 36, 37, which establishes the effective braking force $F_{B1 \ldots i}$ and communicates this value to the brake control unit 15. The brake control unit 15 has in the illustrated example additionally a safety module 44.

The braking equipment 13 according to the present invention is provided for the afore-mentioned different load cases. The braking equipment 13 consists, as illustrated in FIG. 1 and FIG. 2, of at least two of the brake units 14 and each brake unit 14 comprises the normal force regulation means 16, wherein this normal force regulation means 16 regulates the effective normal force $F_{N\text{-}eff}$ in the brake unit 14 in correspondence with the target preset $S_{Bi}$ of the target normal force $F_{N\text{-}soll}$, which is predetermined by the brake control unit 15.

The advantage of this normal force regulation means 16 is that the brake unit 14 itself can rapidly and accurately set a desired normal force and deviations in the region of the brake unit 14, such as, for example, wear or dimensional differences of the brake unit 14 or an associated brake track 9, can be rapidly and directly, i.e. within the brake unit itself, corrected. The susceptibility of the braking equipment to fault is significantly reduced, since compensation for dimensional influences such as rail thickness, brake plate wear or other areas of wear can be directly provided within the brake unit. Moreover, in the case of repair a replacement is possible in simple manner, since the characteristics, which are specific to the brake unit, of the normal force regulation contained in the brake unit are directly, i.e. within the brake unit itself, detected and corrected. As shown in FIG. 1, the brake track 9 can be an elevator car guide rail, a counterweight guide rail, a supporting cable, or any suitable braking surface of the elevator installation.

The brake control unit 15 knows the current state of the elevator installation 1 by way of the reports from the elevator control 5 and/or a corresponding monitoring unit and/or from the measuring sensors 20, such as, for example, acceleration measuring sensor 21, speed measuring sensor 22 or travel measurement sensor 23 and can undertake on the basis of this knowledge the suitable target presetting $S_{Bi}$ of the normal force $F_{N\text{-}soll}$ for the individual brake units 14. Thus, for example, the brake control unit 15 increases the target preset $S_{Bi}$ of the normal force $F_{N\text{-}soll}$ near the shaft end so as to enable, if need be, shortened shaft ends. The brake control unit 15 is advantageously arranged, as illustrated in FIG. 1, on the car 2, if required in combination with further control or safety modules. Measuring and monitoring systems such as described in, for example, patent document WO 03/004397 are advantageously integrated in a safety module of that kind.

This enables the provision of the braking equipment 13 which can hold or brake, depending on the load case, by the corresponding braking force $F_B$, which is dependent on the effective normal force $F_{N\text{-}eff}$. The brake control unit 15 determines, with consideration of the instantaneous state of the elevator installation 1, the optimum use of the brake which is most appropriate to the user and the most sparing. Thus, a braking start value can be calculated on the basis of state magnitudes ascertained by the measuring sensors 20, 21, 22 and 23, whereby a target value $S_{Bi}$ can be predetermined. The advantage of this braking equipment 13 according to the present invention is that a secure braking or holding, which is appropriate to need, of the elevator car 2 is made possible with minimal expenditure of energy.

Figure 4:
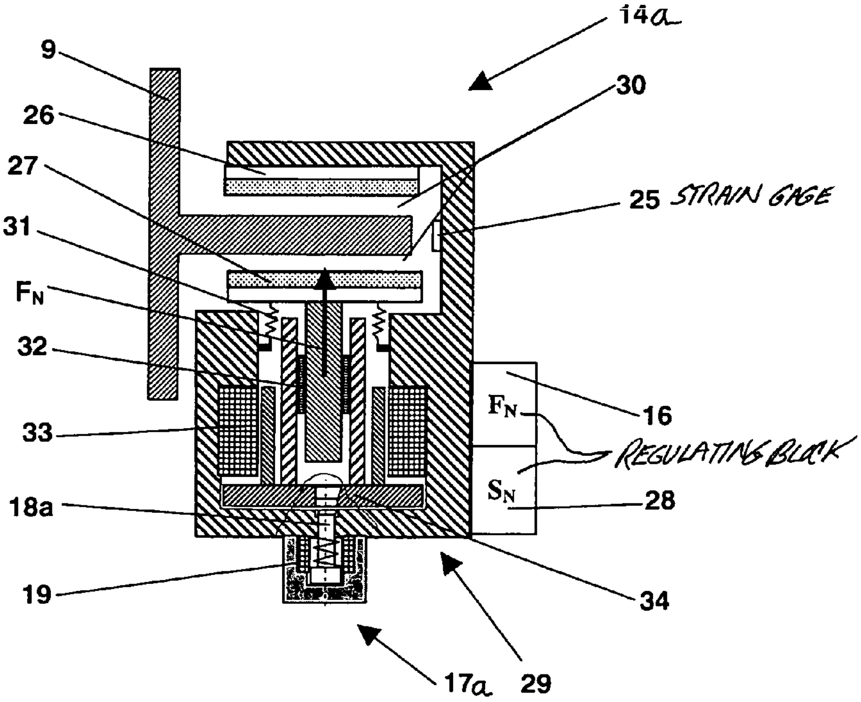
FIG. 4 is a view similar to FIG. 3 of the brake unit with a locking device.
Figure 5:
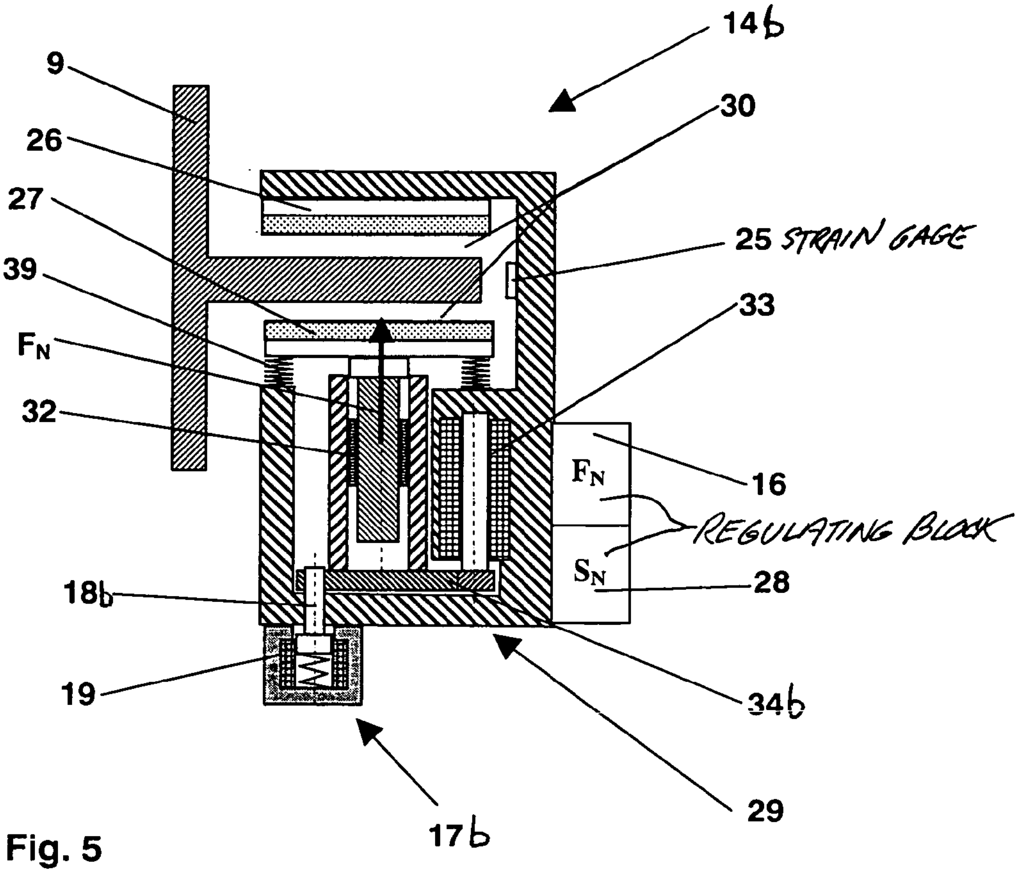
FIG. 5 is a view similar to FIG. 4 of the brake unit with a different locking device.

According to the present invention brake units 14*a* and 14*b*, as illustrated in FIGS. 4 and 5, have a locking device 17*a*, 17*b* which can lock the brake unit in a set braking position corresponding with an effective normal force $F_{N\text{-}eff}$. On application of the normal force a movable brake plate 27 is adjusted. In that case the housing of the brake unit 14*a*, 14*b* is expanded in the elastic region. In the case of need the housing of the brake unit 14*a*, 14*b* can be provided with special resilient devices, for example with springs (not illustrated), which assist this expansion. The locking device 17*a*, 17*b* now locks this stressed braking position, for example by a locking pin 18*a*, 18*b* as illustrated in FIGS. 4 and 5 respectively. This locking makes it possible to ensure a sufficient value of the holding or braking force $F_B$ over a long standstill time with smallest or without expenditure of energy.

The advantage of this alternative or supplementing embodiment of the brake unit 14*a*, 14*b* is that a secure braking or holding of the elevator car with minimal expenditure of energy is made possible and that by means of the locking device 17*a*, 17*b* not only a specific braking force setting can be locked, but substantially any set braking position and thus braking force level can be secured.

In a preferred embodiment of the locking device 17*a*, 17*b* of the brake unit 14*a*, 14*b* this locking device is constructed in such a manner that a set braking position is maintained with interrupted energy feed. The locking pin 18*a*, 18*b* is, for example, brought by means of a control magnet 19 into its locking position or into its open setting. This embodiment is advantageous, since the brake unit 14*a*, 14*b* is thereby held in a secure holding position even in the case of an energy interruption of long duration. An energy interruption of long duration can arise not only unintentionally as a consequence of a supply fault, but can also be intentionally produced when, for example, individual elevators are shut down with buildings not fully occupied. The illustrated embodiment in that case has the advantage that it can be unlocked again only by means of an energy source, which increases security against incorrect operation.

Depending on the selected safety concept the locking, as illustrated in FIG. 5 in the case of an energy failure, takes place independently, wherein the last, instantaneous braking or holding position is secured. This takes place in the illustrated example in that the locking pin 18*b* is brought by means of spring force into its locking setting and held by means of the control magnet 19 in the open setting. Another safety concept proposes that, as apparent in FIG. 4, the self-securing locking pin 18*a* is held open by means of a spring and locked by means of the control magnet 19. This solution is advantageously designed in such a manner that the self-securing locking pin 18*a* in the engaged state is locked by the brake counter-pressure and accordingly can be brought by the spring into the open setting only when a brake adjusting moment is present and the self-securing locking pin 18*a* correspondingly does not have to bear any locking force. The illustrated alternatives allow a selection, which is matched to the overall safety concept, of the appropriate embodiment.

In a further form of embodiment the effective normal force $F_{N\text{-}eff}$ is established by measurement of the mechanical stress of the housing of the brake unit 14*a*, 14*b* for example by means of strain measuring gauges (SMG) 25 as illustrated in FIGS. 4 and 5, or by a force measuring cell 24, as illustrated in FIG. 3, or by means of fixing a clamping path of the movable brake plate 27 of the brake unit or of an energy value, such as current value or a pressure value, corresponding with the adjustment energy. The selection of the suitable normal force dimension $F_{N\text{-}eff}$ is oriented inter alia to the form of embodiment of the brake unit 14, 14*a*, 14*b*. In the case of selection of an electromagnetic brake unit the normal force $F_N$ can be ascertained from the measurement of the electrical adjusting magnitudes, such as voltage and current, or in the case of use of a hydraulic brake unit the pressure in the brake cylinder is a measurement magnitude for determination of the normal force $F_{N\text{-}eff}$. A favorable method for determination of the normal force $F_{N\text{-}eff}$ can be used in dependence on construction.

Advantageously the brake control unit 15 takes into consideration an operational state of the elevator installation 1, such as, for example, the acceleration, speed, loading and load distribution in the elevator car 2, the travel direction or the location of the elevator car 2, and/or a state of the brake unit 14 (14*a*, 14*b*), such as, for example, wear of brake plates 26, 27, and/or of the braking equipment 13, such as, for example, energy reserves or deviations of measuring magnitudes for determination of the target preset $S_{Bi}$ of the target normal force $F_{N\text{-}soll}$. Thus, for example, in the case of the elevator car 2 which has strong eccentric loading the target normal force $F_{N\text{-}soll}$ can be increased or reduced for a specific brake unit. If merely a low braking force $F_B$ is required, the braking of one of the brake units or a group of the brake units can be undertaken. In that case it is particularly advantageous that on the one hand a braking can be carried out appropriately to need and efficiently and that on the other hand, through selective distribution of the requisite braking forces, maximum braking situations referred to individual brake units 14 (14*a*, 14*b*) can be achieved. This increases the overall safety of the elevator installation, since the functional capability of the brake unit in continuous operation can be actively controlled. The risk of damage at standstill is thereby significantly reduced.

An embodiment of the braking equipment 13 proposes that the brake unit 14, as apparent in FIGS. 2 to 5, comprises the adjusting regulation means 28. The adjusting regulation means 28 sets, for example, the desired air gap 30 on the basis of the target preset $S_{Bi}$ of the brake control unit 13. Moreover, the brake unit 14 comprises an adjustment control by means of which brake plate wear and/or departures from a normal behavior of the brake unit 14 can be ascertained. This embodiment makes it possible for the brake unit 14 to be able to set a sufficiently large air gap 30, whereby compensation can be provided for inaccuracies in the braking surface of the guide rail 9 of the elevator car 2—grazing noises of the brake plates 26, 27 with the guide rails 9 are eliminated—and the brake unit 14 can selectively reduce the air gap 30 in advance of anticipated use of a brake—which enables rapid response of the brake unit 14—as well as the exact point of brake use can be determined by establishing the rise in normal force, which makes it possible to establish the brake plate wear. The brake unit 14 reports the ascertained state magnitudes $Z_{Bi}$, adjustment travel and normal force rise to the brake control unit 15 and/or the corresponding safety module 44, which can thereby establish the correct function or which can define, if required, suitable corrective presets $S_{Bi}$. The safety and serviceability of the braking equipment 13 are improved.

A further embodiment of the brake unit 14*a* proposes that the movable brake plate 27 of the brake unit 14*a* is adjusted by means of the adjusting regulation means 28 and the movable brake plate 27, as illustrated in FIG. 4, is retracted by means of a retraction system in correspondence with an adjustment position defined by the adjusting regulation means 28. This is realized, for example, in that a biasing means in the form of a spring mechanism 31 retracts the brake plate, i.e. draws it into open setting, and an adjusting drive 29 actuated by the adjusting regulation means 28 adjusts the movable brake plate 27. This embodiment allows a simple and safe construction, since the adjusting drive 29 is always loaded in pressure. The force to be applied by the spring mechanism 31 is in that case small, since it merely has to overcome internal frictional forces of the adjusting drive 29 and the brake plate guide. Alternatively, the movable brake plate 27 of the brake unit 14*b* is, as illustrated in FIG. 5, preloaded by means of brake compression springs 39. In the case of normal travel operation of the elevator car 2 the adjusting drive 29 holds the brake open against the adjusting force given by the brake compression springs 39. In the case of closing, the normal force ($F_N$) increases in correspondence with the force of the brake compression springs 39. This enables an increase in the braking force ($F_B$) of the brake unit 14*b* without the necessity of a stronger adjusting drive 29. The construction of the measuring of the effective and real normal force ($F_{N\text{-}eff}$) is also selected in dependence on the constructional execution of the adjusting drive.

Figure 8:
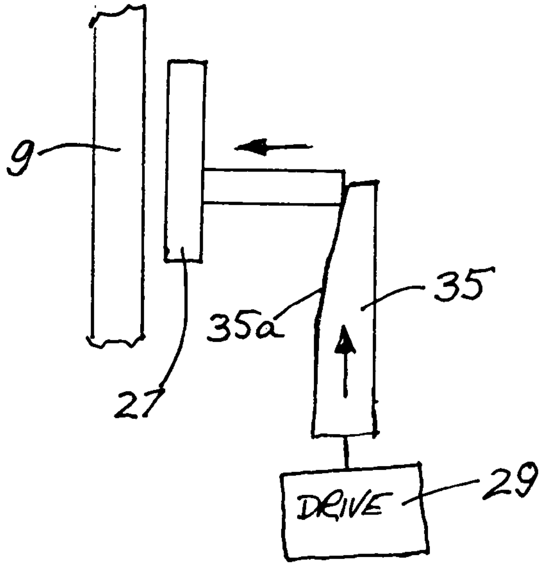
FIG. 8 is a schematic view of an adjusting drive for adjusting the movable brake plate of the brake unit according to the present invention.

Advantageously, the adjusting drive 29 moves the movable brake plate 27 directly perpendicularly to the brake surface, as apparent in FIGS. 3 to 7. The application of force in that case directly enables an economic embodiment of a brake unit 14 (14*a*, 14*b*). Alternatively, the adjusting drive 29 moves the brake plate 27 indirectly by way of a wedge 35 relative to the brake surface (FIG. 8), wherein a wedge angle ($\alpha$) used by the wedge is greater than a "friction angle tan($\mu$)". The use of the wedge 35 increases the normal force able to be applied by the adjusting drive 29. Since the wedge angle used by the wedge 35 is greater than the friction angle, the adjusting drive 29 is always loaded in one direction and dragging in of the brake plate 26 is precluded. In a special form of embodiment the wedge angle ($\alpha$) at the contact surface 35*a* changes over the adjusting travel. This embodiment enables, in particular, a rapid adjustment of the brake plate 27.

The adjusting drive 29 is preferably an electromagnetic spindle drive 32. The spindle drive 32 enables, through the selection of the spindle shape and the spindle pitch, an optimum force amplification and an electric motor 33 can be used for application of the required actuating force. The electric motor 33 is preferably connected with the spindle by way of a gear stage 34, for example by way of the planetary gear, as apparent in FIGS. 3 and 4. This form of embodiment is particularly reliable and robust, since proven functional elements are used and the drive moments at the motor 33 are kept small. In another example illustrated in FIG. 5, a spur wheel gear is used as a gear stage 34*b*. This enables, in particular, use of a very economic motor 33. The locking device 17 can be released particularly advantageously in the case of use of the spindle drive 32, since the adjusting position is locked in a particularly simple manner by means of a locking of the spindle drive 32 or of the spindle nut.

A typical brake unit constructed in that manner has a weight of approximately fifteen kg and the achievable normal force $F_N$ amounts to approximately twenty-five kN. The necessary average power for actuation of a brake unit in that case amounts to less than 0.2 kW. The advantage of the power and weight saving relative to the state of the art is obvious, although incomparably higher normal forces and higher braking forces resulting therefrom can be achieved.

Figure 6:
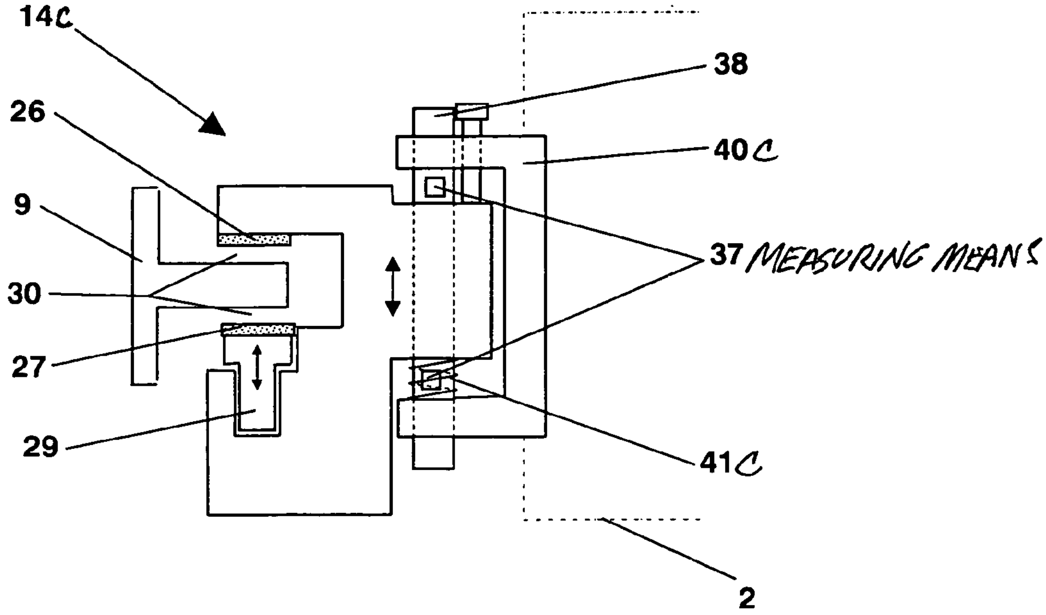
FIG. 6 is a schematic plan view of the brake unit fastened by slide pins and bracket.
Figure 7:
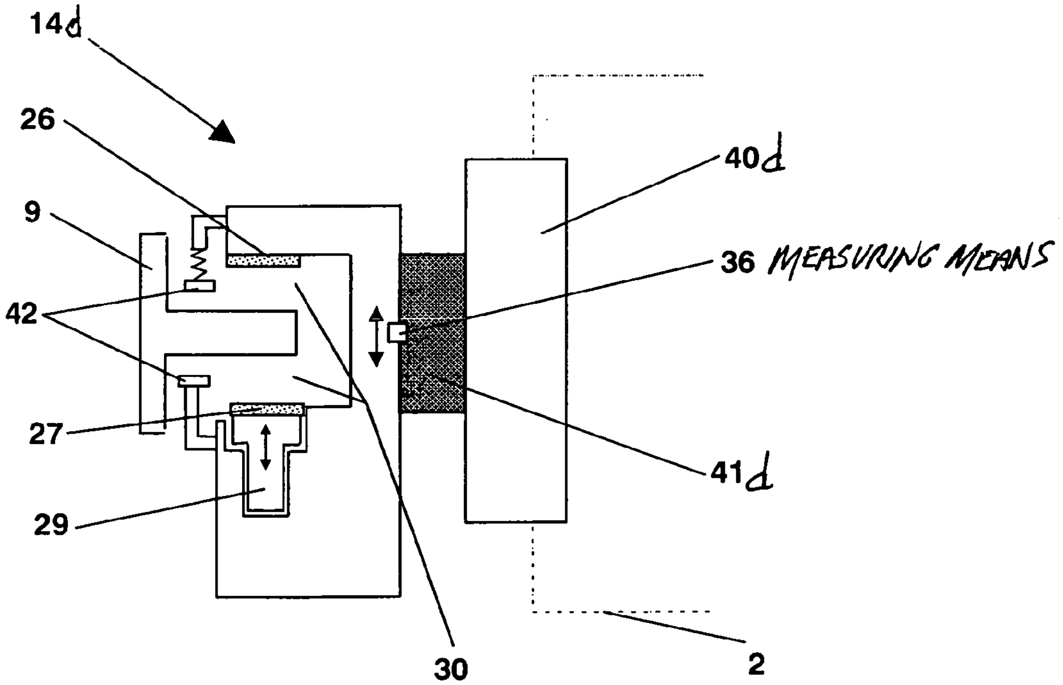
FIG. 7 is a view similar to FIG. 6 with the brake unit fastened by means of resilient element and bracket.

A further variant of embodiment proposes, as is illustrated in simplified form in FIGS. 6 and 7, that the force measuring device 37, 36 measures the braking force or the holding force $F_B$ generated by a brake unit 14*c* and 14*d* respectively. The measurement is carried out by means of, for example, the force measuring cell 36 or a force measuring ring, which is integrated in the fastening of the brake unit 14*c* to the car 2, or the fastening is provided at a suitable place with the strain measuring device 37. The suitable place is determined on the basis of the force flow. In the case of a preferred solution, as illustrated in FIG. 6, the brake unit 14*c* is fastened to the car 2 by means of a slide pin 38, wherein the slide pin 38 at the same time has integrated therein the measuring cells 37 which measure the braking or holding force $F_B$. The slide pin 38 additionally makes it possible for the brake unit 14*c* to be able to be laterally aligned. The advantage of measuring the braking force or holding force $F_B$ resides in the fact that departures from expected behavior can be recognized and suitable measures can be taken. For example, an instantaneous coefficient of friction can be ascertained with knowledge of the braking force $F_B$ and the effective normal force $F_{N\text{-}eff}$. A deviation of the friction value in the case of several brake units 14*c* allows the expectation that a change at the brake rail 9 has taken place (contamination, oil fouling, etc.), which initiates an appropriate control activity or cleaning. A deviation of the friction value in the case of an individual brake unit 14*c* signifies that contamination or wear of an individual brake lining 26, 27 is present. If a value of the adjusting regulation means 28 is taken into consideration together with these evaluations there results a very accurate picture of a state of the brake unit 14*c*, which improves maintenance possibilities and increases safety. Since these evaluations take place in the case of each use of braking, a fault can be recognized at an early point in time, which in turn increases the safety of the entire system for an emergency case. Moreover, measurement of the braking/holding force ($F_B$) at a stop enables, if need be with consideration of the location of the elevator car 2 in the shaft 4, determination of the loading of the elevator car.

In an advantageous development of the invention the deceleration or acceleration of the elevator car 2 is ascertained by the acceleration measuring sensor 21. This enables on the one hand establishing of an abnormal operational situation and moreover enables comfortable braking, which is suitable for the user, in the case of need. Moreover, measurement of the acceleration or deceleration of the elevator car together with measurements of the braking force measuring cell 36, 37 and/or of the normal force measurement cell 24 (FIG. 3), 25 (FIGS. 4, 5) enables a plausibility check of the determined data, which enhances the reliability of the braking equipment.

The braking equipment 13 is usually, as apparent in FIG. 1, arranged at the elevator car 2, wherein the brake units 14 are installed below and/or laterally of and/or above a car body. The location of the installation is determined with consideration of the constructional embodiment of the car 2 as well as the number of necessary brake units 14. The brake units 14 act on the guide rail 9 or a brake track or a brake cable.

Advantageously, the brake unit 14*c*, 14*d*, as illustrated in FIGS. 6 and 7, is attached to the car 2 by means of a bracket 40*c*, 40*d*, wherein the bracket enables distribution of the air gap 30 relative to the brake surfaces and the connection of the bracket to the brake unit is effected by means of an element 41*c*, 41*d* which is resilient or freely movable in the direction of the air gap 30, and substantially rigid in the direction of the braking force. The element 41*c*, 41*d* is set in such a manner that a desired horizontal air gap 30 arises in the readiness setting of the brake unit 14*c*, 14*d*.

In the case of elevator installations 1 it is desired that the elevator car 2 moves with play relative to its guide rails 9. This enables absorption of shocks or unevennesses of the guide rails 9. The illustrated embodiment makes it possible to prevent, with little effort, contact of the brake plates 26, 27 with the guide rails 9.

In the alternative or supplementing embodiment illustrated in FIG. 7 the brake unit 14*d* is guided by means of at least one horizontal guide element 42, which is arranged in the vicinity of the brake plates 26, 27, in such a manner that a small air gap 30 can be set, wherein the guide element 42 produces a horizontal displacement of the brake unit 14*d* relative to the bracket 40*d* and this displacement is made possible by the resilient or a freely movable element 41*d* and the horizontal guide element 42 is constructed either rigidly or resiliently. This embodiment results in the brake unit 14*d* which operates with the minimum air path 30. The brake unit 14*d* can thereby react more quickly, since only small adjusting travels are required for braking, and at the same time the adjusting drive 29 can be of simpler construction, since smaller adjustment travels are required. The brake unit 14*d* is more economic and safety is increased. A quicker reaction of the brake unit enables shortening of the stopping travel of the elevator car, which is helpful particularly in the case of the use of shortened shaft ends.

In an alternative embodiment the brake control unit 13 controls in drive, independently of the operational state, all brake units together or merely groups of the brake units, wherein the allocation of a brake unit to a group is variable. This embodiment enables, even with a small requirement of braking force, individual brake units to be strongly loaded and thus an active detection of function takes place, whereby the functional safety of the braking equipment 13 is increased. Moreover, this drive control is energy-conscientious, since only the required number of the brake units is actuated. A further advantage of this solution is that the load cycles of the individual brake units and, in particular, of the locking device 17*a*, 17*b* are reduced, which correspondingly prolongs the service life or the maintenance intervals of the entire braking equipment 13.

In a supplementing alternative the energy supply 43 of the braking equipment 13 consists of at least two separate energy stores and/or energy mains (redundant) and the energy store and/or energy mains form, together with groups of brake units, a multi-circuit braking system.

The energy stores can be provided in the form of, for example, accumulators or super-capacitors and the energy mains can be provided by the local mains or by local energy generators, such as emergency power apparatus, driven generators. The illustrated alternative enables arrangement of independently functioning brake units. Alternatively, the energy sources are connected together to form a secure energy mains which supplies all brake units in common. The solutions enable selection of the most economic braking equipment 13, which is matched to the local energy situation and which is safe and reliable.

Advantageously, the braking equipment comprises the safety module 44, which safety module 44 monitors the correct functioning and/or the state of each brake unit 14 and/or of the brake control unit 13 and/or of the measuring sensors 20, 21, 22 and 23 and/or of the energy supply 43, wherein the safety module 44 is a constituent of the brake control unit 15 or a separate component. The safety module 44 ensures the functional readiness of the braking equipment 13 as well as efficient maintenance and fault diagnosis. The safety of the braking equipment 13 is increased.

The braking equipment 13 enables wide-ranging optimizations of an elevator installation. Thus, for example, with use of this braking equipment 13 it is possible to substantially simplify a function test program. It is usual today to test a braking system with fully laden or overloaded car 2. This is expensive and overloads the elevator installation 1 beyond the normal. With the equipment according to the present invention the function test program can be simplified. The braking equipment 13 allows, for example, establishing an effectively present coefficient of friction on the basis of a few tests with an empty car 2. With knowledge of the maximum allowed load the braking equipment 13 can calculate a required normal force $F_N$ and the braking equipment 13 can check by means of the normal force measurement 24, 25 whether the required normal force $F_N$ can be achieved with sufficient safety. This enables simplification of the test sequence.

Further refinements of the present invention are possible. Thus, the braking force measurement can be used for determination of the load at a stop, a drive moment required for starting off can thereby be ascertained in simple manner or the braking force measurement can be used for determination of the instant of departure. Moreover, the gear stage 34 for driving the spindle can be, for example, a worm gear. Obviously, in the case of need the braking equipment 13 can also be used for protection of a counterweight or it can be arranged as a drive brake at the drive, for example at the drive pulley. The elevator installation is vertically arranged in the regulating case. The braking equipment according to the present invention can, however, also be installed at other kinds of transport devices, such as, for example, rail transport systems, horizontal transport systems such as cable railways or transport belts.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation with an elevator car that moves in a vertical direction along a pair of guide tracks and a braking equipment for braking the elevator car, the braking equipment comprising:

at least two brake units each attached to the elevator car and each said brake unit associated With one of the guide tracks, each said brake unit generating a first force by pressing a brake plate toward the associated guide track, said first force being a braking force or a holding force for braking or holding the elevator car;

a brake control unit for generating a target force signal for controlling said first force;

a force measuring means associated with each of said brake units to sense an actual value of said first force; and a force regulating means associated with each said brake unit, said force regulating means regulating said first force applied by said associated brake unit in response to said target force signal received from said brake control unit and the actual value of said first force sensed by said force measuring means, wherein each said brake unit includes an adjusting regulating means for setting an air gap predetermined by said brake control unit, said air gap being a spacing between brake plates of said brake unit and a braking surface of the guide track, wherein each said brake unit includes a locking device for locking said brake unit in a set braking position to maintain an actually adjusted first force in case of a reduction or an interruption of the supply of energy to said brake unit.

2. The elevator installation according to claim 1 wherein said locking device includes a locking pin movable by at least one of a control magnet and a spring into a locking position or into an open setting, wherein said locking pin in said locking position locks said braking unit in said set braking position.

3. The elevator installation according to claim 1 wherein said locking device includes a locking pin that is locks said brake unit in response to a brake counter-pressure and can be brought into an open setting only when a brake adjusting force is present.

4. The elevator installation according to claim 1 wherein said force regulating means senses said first force by a measurement of at least one of a mechanical stress of a housing of said brake unit, a signal from a brake measuring force cell, sensing a clamping travel of a brake plate of said brake unit, and an energy value corresponding with an adjusting energy from a supply of energy.

5. The elevator installation according to claim 1 wherein said brake control unit responds to at least one of an operational state of the elevator installation and a state of said brake unit for generating said target force signal.

6. The elevator installation according to claim 1 wherein each said brake unit includes sensing means for ascertaining at least one of brake plate wear and departures from a normal behavior of said brake unit.

7. The elevator installation according to claim 1 wherein each said brake unit has at least one movable brake plate that is adjusted to an adjusting position by an adjusting regulating means, and a biasing means retracting said movable brake plate from engagement with the guide track to said adjusting position.

8. The elevator installation according to claim 1 wherein each said brake unit has at least one movable brake plate that is adjusted to an adjusting position by an adjusting regulating means, and a biasing means for biasing said movable brake plate from said adjusting position toward the guide track.

9. The elevator installation according to claim 1 wherein each said brake unit has at least one movable brake plate connected to an adjusting drive, said adjusting drive being controlled by an adjusting regulating means, said adjusting drive moving said at least one movable brake plate substantially perpendicular to a brake surface of the guide track.

10. The elevator installation according to claim 1 wherein each said brake unit has at least one movable brake plate coupled to an adjusting drive through a wedge, said adjusting drive being controlled by an adjusting regulating means, said adjusting drive moving said at least one movable brake plate substantially perpendicular to a brake surface of the guide track, said wedge having a contact surface forming at least one of a wedge angle greater than a friction angle of said movable brake plate and a wedge angle that changes over an adjustment path of said movable brake plate.

11. The elevator installation according to claim 1 wherein each said brake unit has at least one movable brake plate connected to an adjusting drive, said adjusting drive being an electromagnetic spindle drive with said spindle being actuated by a gear stage.

12. The elevator installation according to claim 1 including at least one of a force measuring means for measuring the braking force or the holding force applied by said brake unit and an acceleration measuring sensor for sensing deceleration and acceleration of the elevator car.

13. The elevator installation according to claim 1 wherein the braking equipment is mounted on the elevator car with said brake units being installed at least one of below, laterally and above a car body of the elevator car whereby said brake units act on the guide track.

14. The elevator installation according to claim 1 wherein each said brake unit is installed on the elevator car by a bracket enabling distribution of an air gap between brake surfaces of said brake unit and the guide track, said bracket being connected to said brake unit by a resilient or freely movable connecting element to provide a desired horizontal air gap in a readiness setting of said brake unit.

15. The elevator installation according to claim 14 wherein each said brake unit is guided by at least one horizontal guide element adjacent brake plates to permit a relatively small air gap to be set, said guide element producing a horizontal displacement of said brake unit relative to said bracket in cooperation with said resilient or freely movable element and wherein said at least one horizontal guide element is constructed to be either substantially rigid or resilient.

16. The elevator installation according to claim 1 wherein said brake control unit depending on an operational state of said brake units controls all said brake units together or in drive groups wherein allocation of a one of said brake units to one of said groups is variable.

17. The elevator installation according to claim 1 wherein a supply of energy to the braking equipment includes at least two separate energy supplies connected to said brake units to form one of a multi-circuit braking system and a secure energy supply supplying all of said brake units in common.

18. The elevator installation according to claim 1 including a safety module for monitoring operation of at least one of each said brake unit, said brake control unit, measuring sensors, and a supply of energy.

19. A method of braking and holding an elevator installation having braking equipment and an elevator car which is moved in a vertical direction along a pair of guide tracks comprising the steps of:

a. providing the braking equipment including at least two brake units each attached to the elevator car and each said brake unit associated with one of the guide tracks, each said brake unit generating a first force by pressing a brake plate toward the associated guide track, said first force being a braking force or a holding force for braking or holding the elevator car, a brake control unit for generating a target force signal for controlling said first force, a force measuring means associated with each of said brake units to sense an actual value of said first force, and a force regulating means associated with each said brake unit, said force regulating means regulating said first force applied by said associated brake unit in response to said target force signal received from said brake control unit and the actual value of said first force sensed by said force measuring means, wherein each said brake unit includes an adjusting regulating means for setting an air gap predetermined by said brake control unit, said air gap being a spacing between brake plates of said brake unit and a braking surface of the guide track, wherein each said brake unit has a locking device;

b. operating each of the force regulating means to apply said first force set in correspondence with said target force signal determined by said brake control unit; and c. operating each of the locking devices to lock the associated one of the brake units in a set braking position corresponding with said first force.

20. An elevator installation with an elevator car that moves in a vertical direction along a pair of guide tracks and a braking equipment for braking the elevator car, the braking equipment comprising:

at least two brake units each attached to the elevator car and each associated with one of the guide tracks, each said brake unit generating a first force by pressing a brake plate toward the associated guide track, said first force being a braking force or a holding force for braking or holding the elevator car, said brake plate being connected to an adjusting drive, said adjusting drive moving said brake plate relative to the associated guide track and applying and adjusting said first force, said adjusting drive being an electromagnetic spindle, drive with said spindle being actuated by a gear stage, wherein each said brake unit includes an adjusting regulating means, for setting an air gap predetermined by Said brake control unit, said air gap being a spacing between brake plates of said brake unit and a braking surface of the guide track;

a brake control unit for generating a target force signal for controlling said first force;

a force measuring means associated with each of said brake units to sense an actual value of said first force; and a force regulating means associated with each of said brake units, said force regulating means regulating said first force applied by said associated brake unit in response to said target force signal received from said brake control unit and said actual value of said first force sensed by said force measuring means, wherein each said brake unit further includes a locking device for locking said brake unit in a set braking position to maintain an actually adjusted first force in case of a reduction or an interruption of a supply of energy to said brake unit, said locking device includes a locking pin that locks said brake unit in response to a brake counter-pressure if brought into its locking position and said locking pin can be brought from its locking position into an open setting only when a brake adjusting force is present.

21. The elevator installation according to claim 20 wherein each said brake unit further includes a sensing means for ascertaining at least one of brake plate wear and departures from a normal operating behavior of said brake unit.

22. The elevator installation according to claim 21 wherein said braking equipment includes an acceleration measuring sensor for sensing deceleration and acceleration of the elevator car, each of said brake unit further includes a brake force measuring means for measuring a braking force value or a holding force value generated by said brake unit and transmitting said measured braking force value or said measured holding force value to said brake control unit, said brake control unit responds to at least one of an operational state of the elevator installation, a state of said brake unit and said deceleration and acceleration of the elevator car for generating said target force signal.

* * * * *